Figure 5:
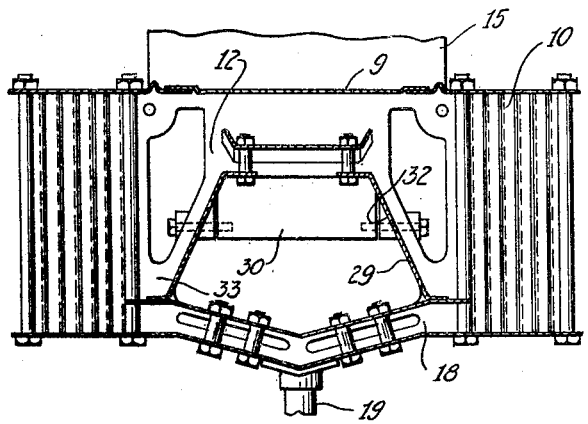

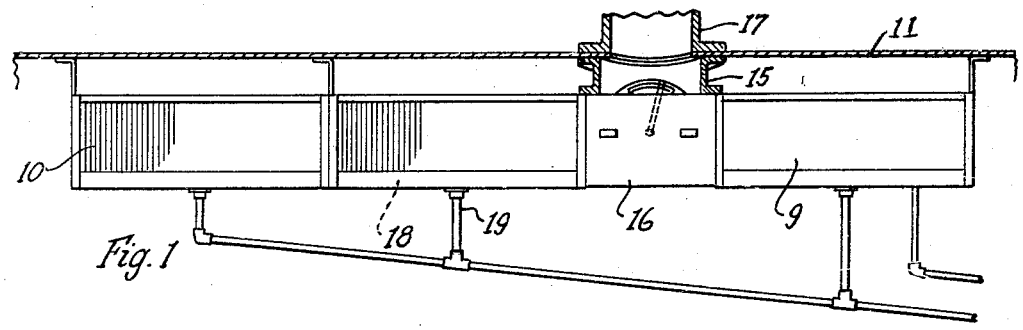
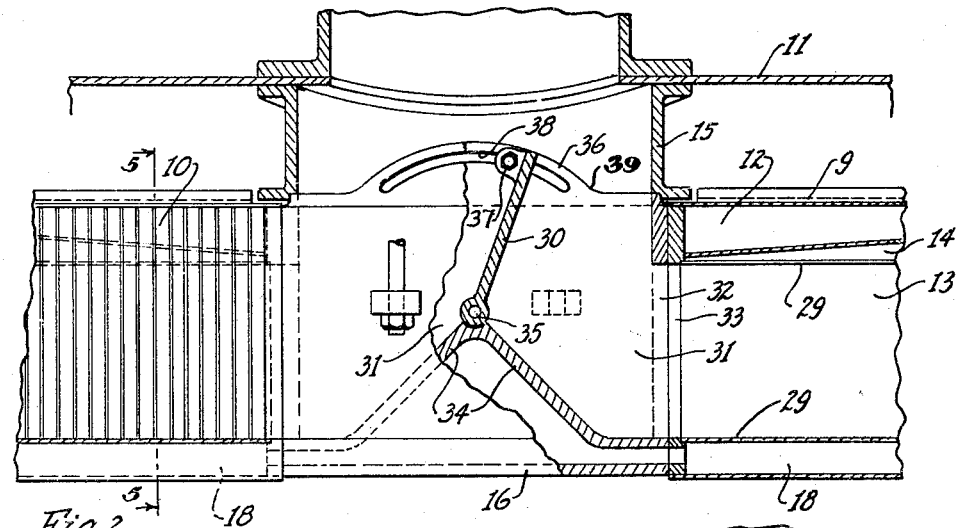
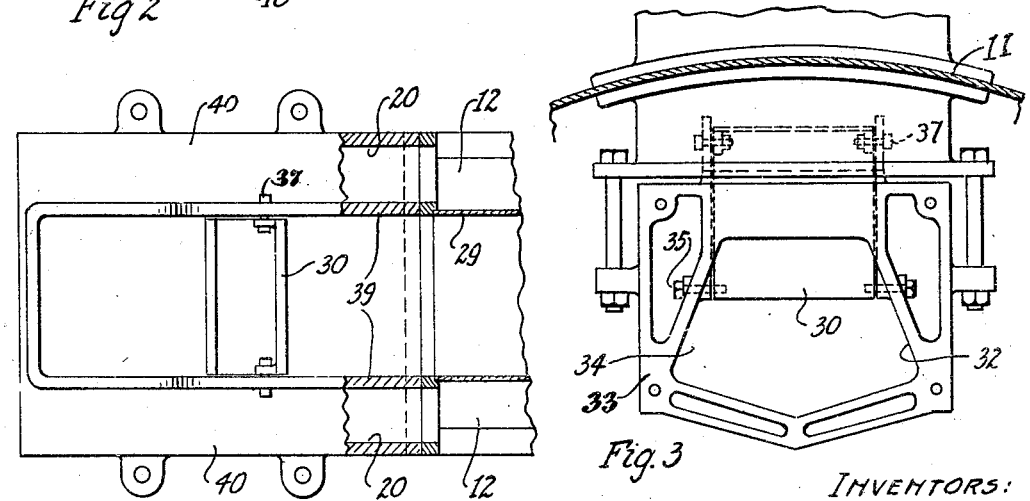

March 17, 1931.  G. D. BRADSHAW ET AL  1,796,435
FLUID SEPARATOR
Filed May 20, 1927  2 Sheets-Sheet 2

INVENTORS.
Ralph N. Robertson.
Grant D. Bradshaw
By E. J. Andrews
Atty.

Patented Mar. 17, 1931

1,796,435

UNITED STATES PATENT OFFICE

GRANT D. BRADSHAW AND RALPH N. ROBERTSON, OF PITTSBURGH, PENNSYLVANIA, ASSIGNORS, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed May 20, 1927. Serial No. 192,825.

This invention relates to fluid separators, and particularly those used for purifying gases by separating, from the gases, liquid particles or other impurities. The invention has for one of its objects providing means for increasing the efficiency and capacity of the separators by reducing the tendency towards counter-currents and eddy currents, and in general to equalize more completely the flow of the fluids through the various portions of the separator.

Although the invention is applicable to various types of separators used for various purposes, yet for the purpose of illustrating our invention we have described it as applying to steam separators used for drying and purifying the steam in boilers and particularly to that type of separator known by the trade as "Tracyfiers".

Of the accompanying drawings Fig. 1 is an elevation of a separator mounted in a boiler, which embodies the features of our invention; Fig. 2 is an enlarged central sectional elevation of the T and outlet of the separator connected to a boiler and partly in section; Fig. 3 is an end view of the T and outlet; and Fig. 4 is a plan view of the T; and Fig. 5 is a sectional view along the line 5—5 of Fig. 2.

As is well understood, separators 9 of this nature are mounted in boilers 11 and comprise a system of baffles 10 which are mounted in the sides or other parts of the casing of the separator sections; and a steam or gas passageway 12 is provided through which the gas flows from the baffles into an inner conduit 13 through a slot 14. From the conduit 13 the gas flows to the outlet 15 of the separator, through a T casing 16, and thence to the gas or steam main 17 of the system. The moisture and impurities which are separated from the gas flow downwardly into a liquid chamber 18, and is then drained off through pipes 19 in any suitable manner.

We have found, particularly when long separators, such as are illustrated in Fig. 1, are installed in boilers, or elsewhere, with the outlet 15 positioned a material distance from one end, and especially when there are sections of the separator on each side of the outlet, that there is a tendency for eddy currents or counter-currents to be set up both in the steam passageways 12 and 13 and in the water passageways 18.

It is to be understood that the passageways 12 extend continuously through the separator from one end to the other, communicating with the passageways 20 in the T. These passageways in the separator sections are separated from the inner conduit 13 by means of plates 29 on the sides and bottom of the conduit. The inner conduit 13 communicates with chambers 31 in the T, which in turn communicate with the outlet 15. But the passageways 20 in the T are separated from the chambers 31 by a plate 39 on each side of the chambers 31 and plates 40 separate the passageways 20 from the outlet 15. Hence, all of the steam passing from the baffles into the inner conduit passes through the slots 14.

To reduce the tendency towards undesirable currents, especially counter-currents, I provide a baffle 30 in the central portion of the T so as to prevent the gas which is flowing into the T from one side from driving against the gas which is flowing into the T from the opposite side. The inner conduits 13 of the sections communicate with the chamber 31 of the T, by means of openings 32, in the end plates of the T and registering openings 33, in the adjacent end plates of the sections. As a consequence of this arrangement the steam or gas flowing into the T from one side ordinarily tends to drive onwardly against the stream flowing into the T from the opposite side, and a loss of energy results. But, by providing the baffles 34, the entering stream is driven upwardly towards the outlet; and, by providing the baffle 30, there can be no effect of either of the entering streams on the other until the streams are directed in parallel directions, passing through the outlet.

Inasmuch as it sometimes occurs that the separator is longer on one side of the T than on the other, we have found it desirable to provide means for varying the relative sizes of the chambers 31 on each side of the baffles 34 and 30, as the longer portion of the separator is necessarily delivering more gas to the T and should have a larger passage way through which to deliver the gas. Any suitable means may be used for adjusting the relative sizes of these two chambers. I prefer for the purpose to provide means for adjusting the position of the plate 30. In this insance we pivot the plate 30, by means of a pivot 35, to the baffle plates 34. The plate 30 may then be rotated around the pivots to the most suitable point in view of the existing conditions. In order to hold the plate in position we provide an arcuate plate 36, having a slot 38 therein, and, by means of a bolt 37, the edge of the plate 30 may be clamped to the plate 36 in any desired position, it being understood that the position will depend upon the relative length of the separator on each side of the T 16.

We claim as our invention:

1. A gas separator comprising a T having an outlet on one side and an inlet on each of two other opposite sides, a section of the separator being connected to each of said opposite sides, each of said sections having a gas conduit therein communicating with the inlet in the side to which it is connected, said T having walls therein forming separate chambers connecting said inlets with said outlet, and said walls having a movable plate for varying the relative sizes of said connecting chambers.

2. A gas separator comprising a T having an outlet on one side and an inlet on each of two other opposite sides, a section of the separator being connected to each of said opposite sides, each of said sections having a gas conduit therein communicating with the inlet in the side to which it is connected, said T having walls therein forming separate chambers connecting said inlets with said outlet, said walls comprising a pivoted plate, and means for fastening said plate in adjusted positions.

3. A gas separator system comprising a T having an outlet on one side and an inlet on each of two opposite sides, an elongated separator connected to each of said inlet sides, each of said separators having an inner elongated gas conduit communicating with the inlet in the side to which it is connected, a chamber in said T connecting said outlet and inlets, and a partition in said chamber between said two inlets and extending to said outlet, said T having a gas passageway extending from one inlet side to the other, and each of said separators having an elongated gas passageway communicating with the said gas passageway of said T.

In testimony we hereunto set our hands.

GRANT D. BRADSHAW.
RALPH N. ROBERTSON.